United States Patent
Jain et al.

(10) Patent No.: US 12,130,782 B2
(45) Date of Patent: Oct. 29, 2024

(54) PROACTIVE AUTO SCALING IN A SCALED MULTI-TENANT ENVIRONMENT

(71) Applicant: Dell Products L.P., Round Rock, TX (US)

(72) Inventors: Shailesh Jain, Bangalore (IN); Srinivasa Ragavan Rajagopalan, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/164,696

(22) Filed: Feb. 6, 2023

(65) Prior Publication Data

US 2024/0264981 A1    Aug. 8, 2024

(51) Int. Cl.
| | |
|---|---|
| G06F 15/16 | (2006.01) |
| G06F 16/17 | (2019.01) |
| G06F 16/182 | (2019.01) |
| H04L 43/0888 | (2022.01) |

(52) U.S. Cl.
CPC ........ *G06F 16/182* (2019.01); *G06F 16/1734* (2019.01); *H04L 43/0888* (2013.01)

(58) Field of Classification Search
None
See application file for complete search history.

(56) References Cited

U.S. PATENT DOCUMENTS

| | | | | |
|---|---|---|---|---|
| 11,038,986 | B1* | 6/2021 | Acar | H04L 67/10 |
| 2009/0094248 | A1* | 4/2009 | Petersen | H04L 51/226 |
| 2013/0139138 | A1* | 5/2013 | Kakos | G06F 8/65 |
| | | | | 709/224 |
| 2017/0024201 | A1* | 1/2017 | Diedrich | G06F 8/65 |
| 2018/0239807 | A1* | 8/2018 | Dhuse | G06F 16/27 |
| 2018/0253294 | A1* | 9/2018 | Kelly | H04W 4/21 |
| 2021/0173709 | A1* | 6/2021 | Rusev | G06F 8/65 |
| 2022/0391187 | A1* | 12/2022 | Brooks Powell | G06F 8/65 |

OTHER PUBLICATIONS

McKittrick, Micah et al., Overview of Autoscale with Azure Virtual Machine Scale Sets, online article, Dec. 1, 2022, Microsoft, https://learn.microsoft.com/en-us/azure/virtual-machine-scale-sets/virtual-machine-scale-sets-autoscale-overview.

Amazon Web Services, Inc., What is Amazon EC2 Auto Scaling?, User Guide, last accessed on Feb. 2, 2023, AWS, https://docs.aws.amazon.com/autoscaling/ec2/userguide/ec2-auto-scalingpredictive-scaling.htm.

* cited by examiner

*Primary Examiner* — Alex Gofman
(74) *Attorney, Agent, or Firm* — Kirton McConkie; Brian Tucker (57) ABSTRACT

Proactive auto scaling can be implemented in a scaled multi-tenant cloud environment. For a particular update window, a management server can obtain tenant details for each tenant whose endpoints are to be updated during the update window using a file server. The management server can use the tenant details to calculate a total update time for deploying a respective update to each of the endpoints. If the total update time will exceed the update window, the management server can create one or more additional file servers and cause some of the endpoints to obtain their respective update from the one or more additional file servers to thereby ensure that all the endpoints can complete the update during the update window.

20 Claims, 8 Drawing Sheets

FIG. 2G

PROACTIVE AUTO SCALING IN A SCALED MULTI-TENANT ENVIRONMENT

CROSS-REFERENCE TO RELATED APPLICATIONS

N/A

BACKGROUND

Many enterprises, companies, or other entities use a management server to manage their endpoints. Oftentimes, the management server implements a multi-tenant environment meaning that endpoints pertaining to multiple tenants are managed via the same management server. This management typically includes the deployment of updates.

A tenant's administrator typically schedules the deployment of an update during an update window. In such a case, each of the tenant's endpoints will attempt to download an update from a file server during the update window. The file server will typically have a maximum number of concurrent connections and therefore many of the endpoints will be placed in a queue to await their turn to download the update. In a multi-tenant scenario, multiple tenants would typically be assigned to the same file server and may have overlapping update windows, and therefore many tenants could be placed in the queue. In such scenarios, it is not uncommon for the update window to pass while tenants remain in the queue thus preventing such tenants from receiving the update. This problem is exacerbated when the update to be downloaded is large and/or when endpoints have slow network speeds.

BRIEF SUMMARY

The present invention extends to systems, methods, and computer program products for implementing proactive auto scaling in a scaled multi-tenant environment. For a particular update window, a management server can obtain tenant details for each tenant whose endpoints are to be updated during the update window using a file server. The management server can use the tenant details to calculate a total update time for deploying a respective update to each of the endpoints. If the total update time will exceed the update window, the management server can create one or more additional file servers and cause some of the endpoints to obtain their respective update from the one or more additional file servers to thereby ensure that all the endpoints can complete the update during the update window.

In some embodiments, the present invention may be implemented by a management server as a method for proactive auto scaling in a scaled multi-tenant environment. The management server can identify an update window during which endpoints of a plurality of tenants are scheduled to obtain a respective update from a file server. The management server can determine a total update time for each of the plurality of tenants. The management server can determine, based on the total update time of each of the plurality of tenants, that not all the endpoints of the plurality of tenants will be able to obtain the respective update from the file server. The management server can create one or more additional file servers. The management server can then instruct a subset of the endpoints of the plurality of tenants to obtain the respective update from the one or more additional file servers during the update window.

In some embodiments, the present invention may be implemented as computer storage media storing computer executable instructions which when executed implement a management server that is configured to implement a method for proactive auto scaling in a scaled multi-tenant environment. The management server can obtain tenant details from a plurality of tenants that have scheduled an update during an update window. The management server can calculate, for endpoints of the plurality of tenants, a download time for each of the endpoints based on a network speed of the respective endpoint. The management server can calculate, for each of the plurality of tenants, a total update time based on the download time for each of the endpoints of the respective tenant. The management server can determine, from the total update time calculated for each of the plurality of tenants, that not all the endpoints of the plurality of tenants will be able to obtain the respective update from a file server during the update window. The management server can create one or more additional file servers from which a subset of the endpoints of the plurality of tenants will obtain the respective update.

In some embodiments, the present invention may be implemented as a system that includes a management server, a plurality of tenants that each have a plurality of endpoints, and one or more file servers. The management server can be configured to implement a method for proactive auto scaling when the plurality of endpoints of the plurality of tenants are scheduled to be updated during an update window. The management server can identify a network speed for each of the plurality of endpoints of each of the plurality of tenants. The management server can calculate a download time for each of the plurality of endpoints of each of the plurality of tenants. The download time can be calculated from the network speed of the respective endpoint and a size of an update that the respective endpoint is scheduled to obtain during the update window. The management server can calculate an average update time for each of the plurality of tenants. The average update time can be calculated based on the download times of the endpoints of the respective tenant. The management server can calculate a total update time for each of the plurality of tenants. The total update time can be calculated based on the average update times of the endpoints of the respective tenant. The management server can create one or more additional file servers based on the total update time for each of the plurality of tenants.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification and the claims, an endpoint should be construed as including any end user computing device which may be managed from a management server. For example, managed devices may be desktops, laptops, thin clients, tablets, smart phones, etc. A management server may be implemented in the cloud or on-premises. A file server should be construed as a repository where files pertaining to updates are stored and from which endpoints may download the file(s) pertaining to their respective update.

Figure 1:
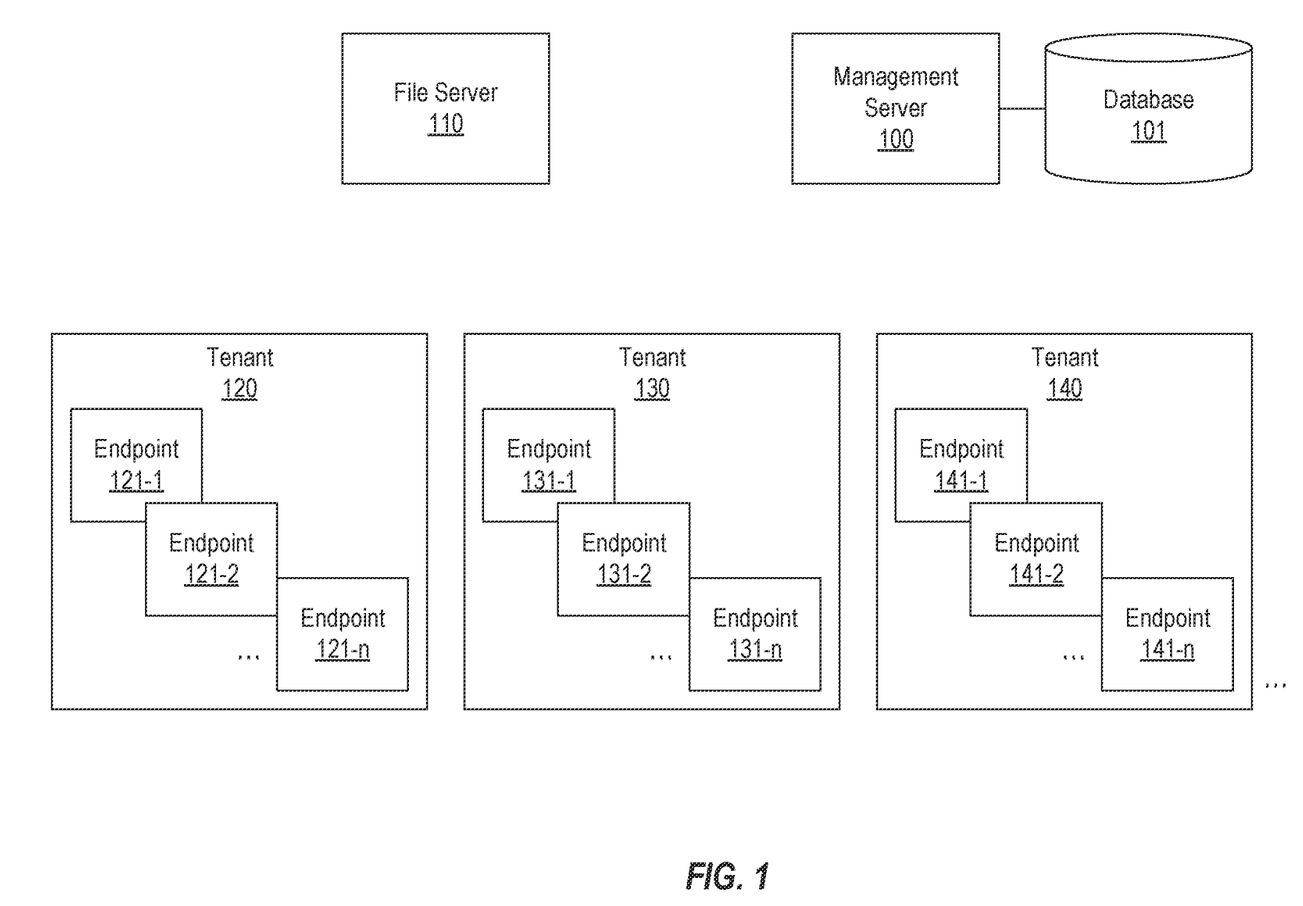
FIG. 1 provides an example of a computing environment in which embodiments of the present invention may be implemented.

FIG. 1 provides an example of a computing environment in which embodiments of the present invention may be implemented. The computing environment includes a management server 100 which is used by multiple tenants to manage their endpoints. In the depicted example, there are three tenants: tenant 120 having endpoints 121-1-121-n, tenant 130 having endpoints 131-1-131-n, and tenant 140 having endpoints 141-1-141-n. However, there could be many more in some implementations of the present invention.

Management server 100 can represent any collection of network accessible components that provide the functionality described herein and may be located in the cloud or on-premises (e.g., when an enterprise has multiple tenants and management server 100 is deployed on the enterprise's local network). Management server 100 may employ a database 101 to store the various types of information described herein. File server 110 can represent a repository that is accessible to the endpoints of tenants 120, 130, and 140 and by which management server 100 deploys updates to these endpoints. An update could include one or more files. Also, an update could be specific to the endpoints of a single tenant or could be provided to endpoints of more than one tenant. Simply put, each endpoint can be configured to access file server 110 (e.g., via a specified URL) to obtain each file of an update that has been scheduled for deployment to the endpoint.

As an overview, embodiments of the present invention can be implemented to proactively auto scale in a multi-tenant environment, such as the environment depicted in FIG. 1, to ensure that the endpoints of all tenants that are to be updated during a particular update window can obtain their respective updates during the particular update window. This proactive auto scaling can include dynamically determining whether an existing number of file servers in the multi-tenant environment will be sufficient to deploy the updates to all the endpoints during the particular update window, and if not, proactively deploying one or more additional file servers that will be sufficient.

FIGS. 2A-2G provide an example of how proactively auto scaling can be implemented in a multi-tenant environment. The example of FIGS. 2A-2G will be based on the example multi-tenant environment shown in FIG. 1. However, it is to be understood that embodiments of the present invention could be implemented in any multi-tenant environment that includes more than two tenants.

Figure 2A:
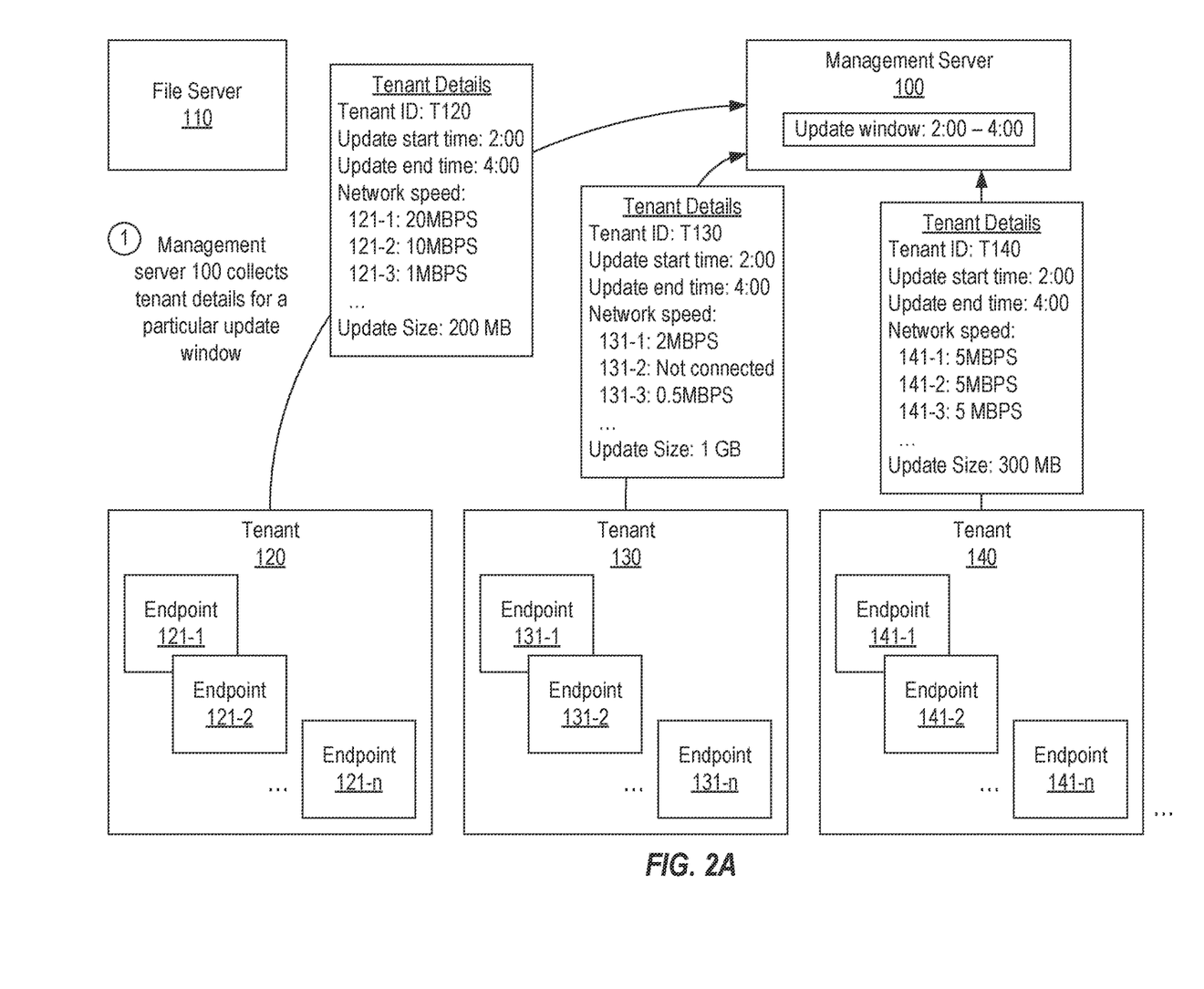
FIGS. 2A-2G provide an example of how proactive auto scaling in a scaled multi-tenant environment can be implemented in accordance with embodiments of the present invention.

Turning to FIG. 2A, in step 1, management server 100 can collect tenant details for a particular update window for tenants in the multi-tenant environment (e.g., each tenant that is configured to use file server 110 to obtain updates). In this example, it is assumed that the particular update window is 2:00 to 4:00. The tenant details may include a tenant ID, a start and end time for an update, network speeds for each of the tenant's endpoints, and an update size.

Although FIG. 2A shows management server 100 obtaining the tenant details from each tenant generally, management server 100 could obtain the tenant details in any suitable way. For example, database 101 could store the update start and end times such as when an administrator has previously interfaced with management server 100 to provide such times. Database 101 could also store the update size or management server 100 could obtain the update size from file server 110 where the update may be stored. The network speed for each endpoint could be obtained by querying an agent deployed on each endpoint to obtain the endpoint's current network speed or other network parameters. In some embodiments, management server 100 may store the tenant details in database 101.

For simplicity, in FIG. 2A, the update start and end times for each tenant is the same and matches the update window. However, the update start and end times could be different for each tenant but may overlap within one another and/or the update window. Of importance is that endpoints from multiple tenants could be scheduled to obtain an update from file server 110 at the same time.

FIG. 2A also represents that the tenant details may not include a network speed for an endpoint. For example, if an endpoint is not powered on or does not have network access, management server 100 may not be able to retrieve a network speed for the endpoint. In some embodiments, management server 100 may obtain the tenant details, and particularly the network speeds of the endpoints, right before the update window so that the tenant details provide an accurate representation of the state of the endpoints during the update window.

Figure 2B:
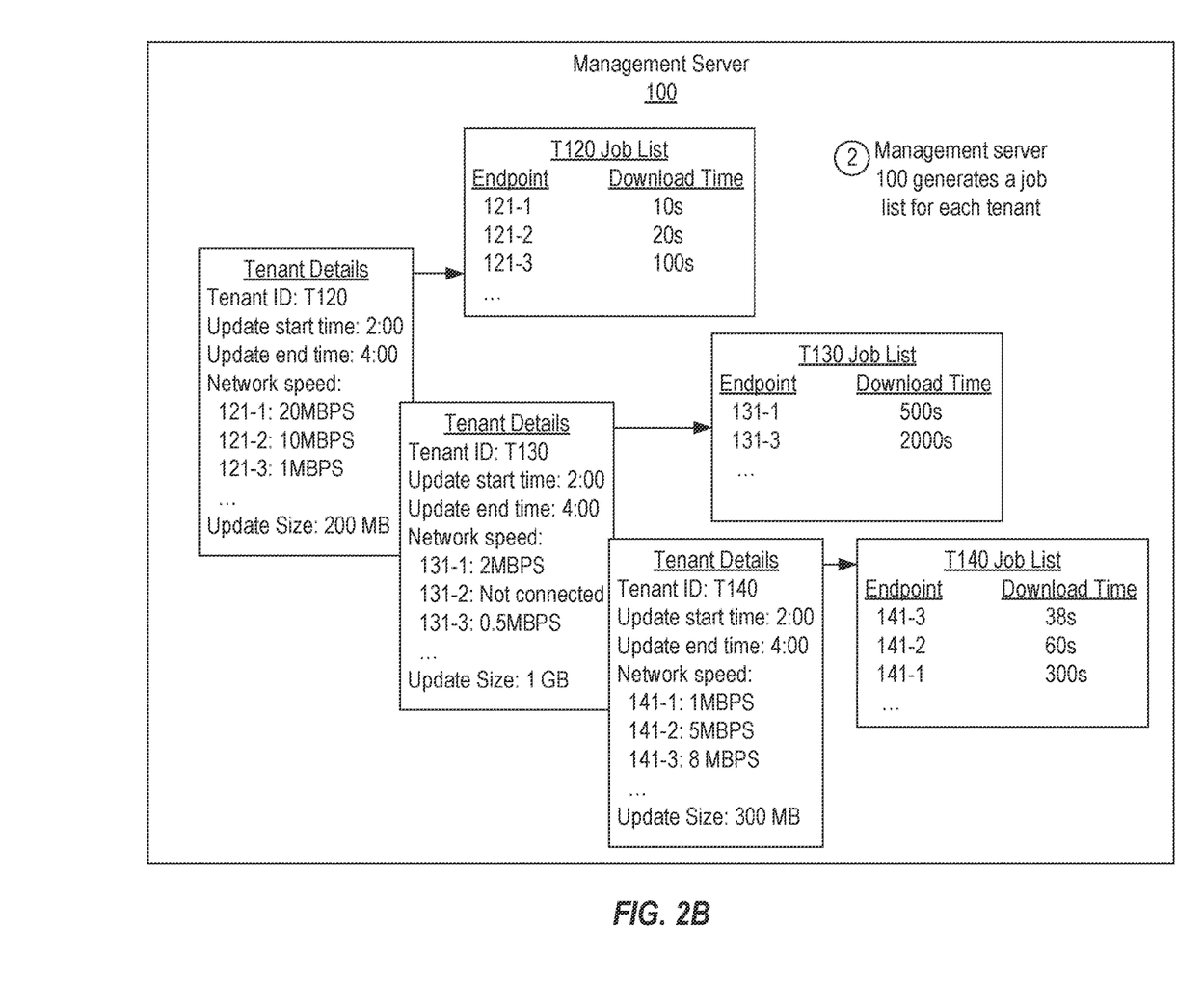

Turning to FIG. 2B, in step 2, management server 100 can generate a job list for each tenant whose endpoints are scheduled to be updated during the particular update window. In this example, management server 100 can therefore generate a job list for tenant 120, tenant 130, and tenant 140. As represented in FIG. 2B, each job list can define a download time for each of the tenant's endpoints that are to be updated during the particular update window. Management server 100 can use the tenant details to calculate these update times. For example, management server 100 may divide the update size by the endpoint's reported network speed. If a network speed was not reported for an endpoint (or if the endpoint is otherwise determined to not be powered on or to not have network connectivity), management server 100 can omit the endpoint form the tenant's job list. This ensures that the job list will only reflect download times for endpoints that are likely to download the update during the update window. Management server 100 may also sort the job lists by download time in ascending order. For example, the job list for tenant 120 lists endpoints 121-1, 121-2 and 121-2 in order because their calculated download times are 10 s, 20 s, and 100 s respectively. Notably, a tenant may typically have many endpoints and therefore the job lists could be relatively long.

Figure 2C:
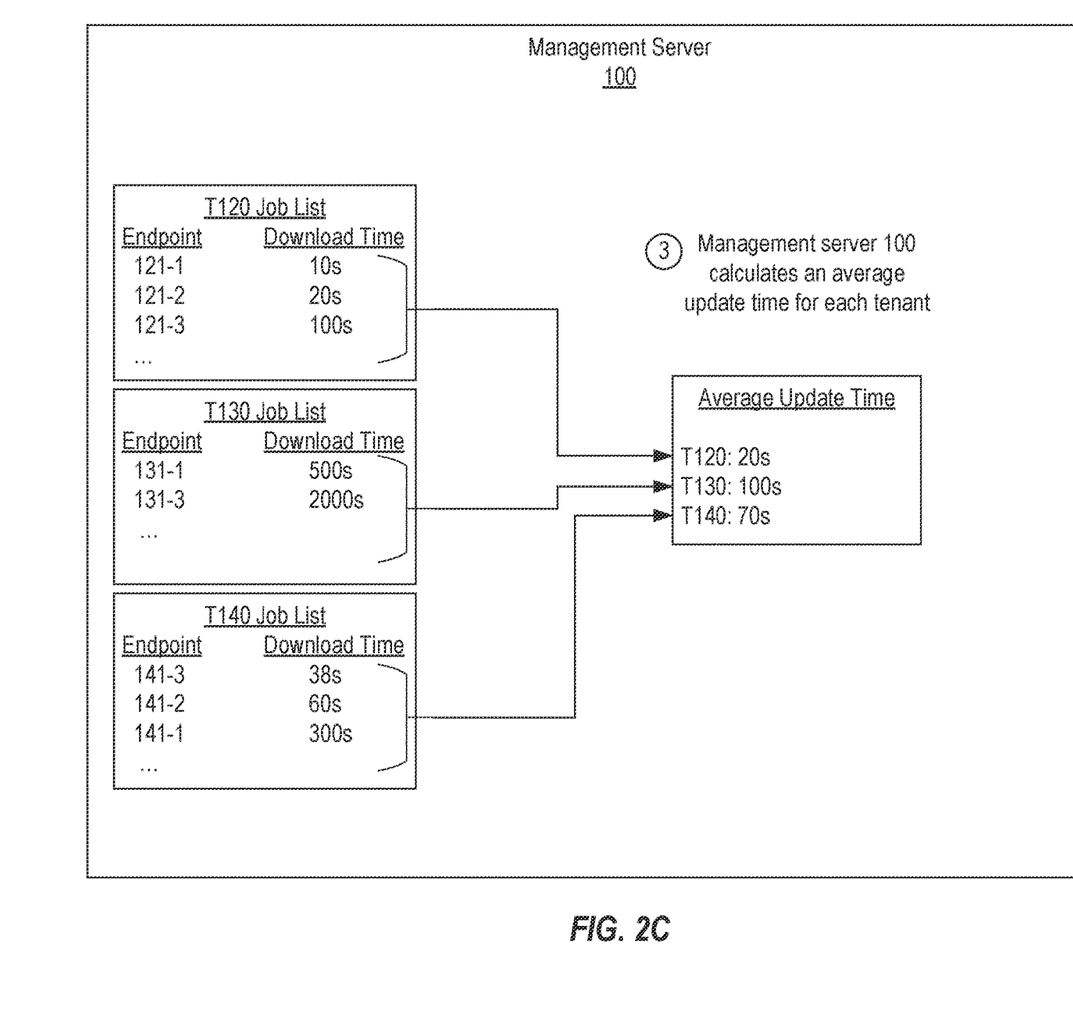

Turning to FIG. 2C, in step 3, management server 100 may use the job lists to calculate an average update time for each tenant. For example, management server 100 could sum the download times in a tenant's job list and then divide the sum by the number of endpoints in the job list. In this example, it is assumed that management server 100 calculates average update times of 20 s, 100 s, and 70 s for tenant 120, tenant 130 and tenant 140 respectively. In some embodiments, management server 100 may generate a sorted list of the average update times starting with the tenant with the lowest average update time.

Figure 2D:
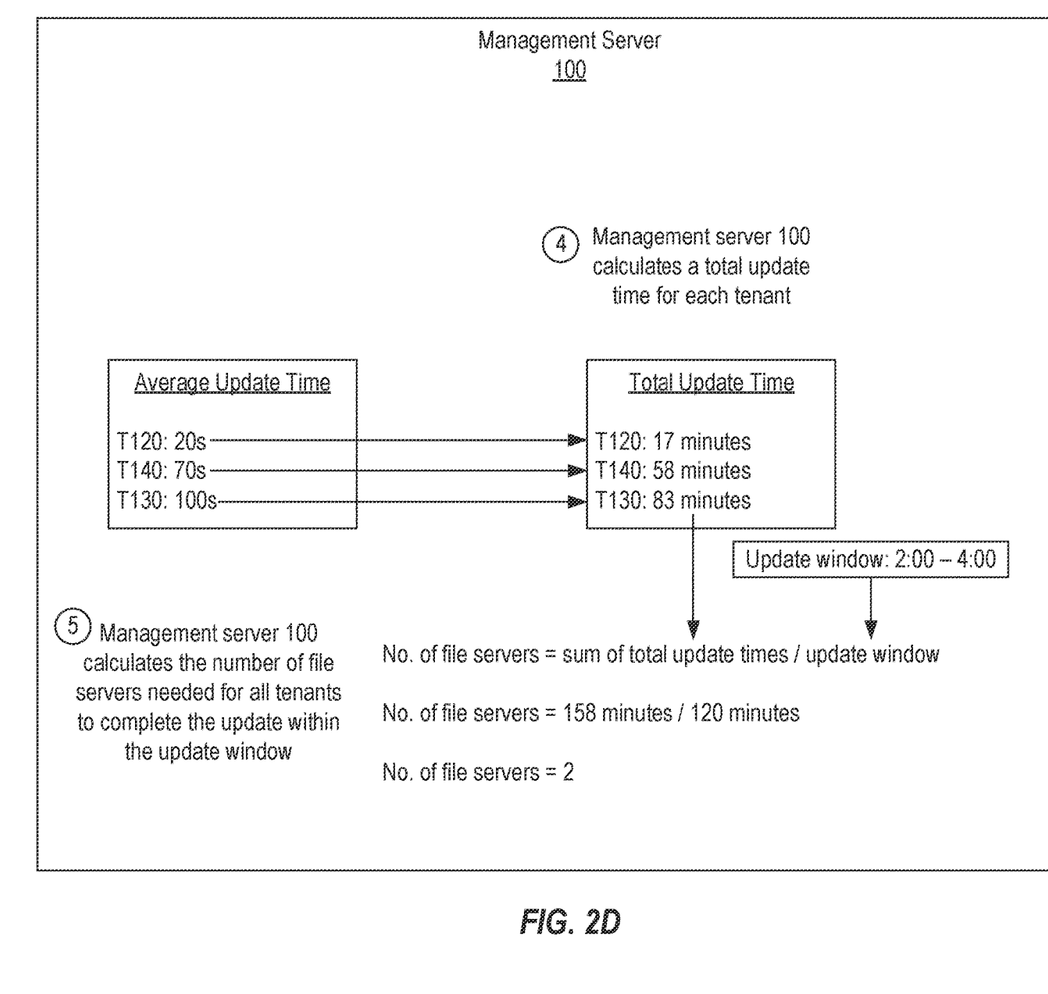

Turning to FIG. 2D, in step 4, management server 100 can calculate a total update time for each tenant using the respective average update times. In FIG. 2D, which now shows the average update time list as being sorted in ascending order, it is assumed that management server 100 calculates total update times of 17 minutes for tenant 120, 58 minutes for tenant 140, and 83 minutes for tenant 130. In some embodiments, management server 100 may calculate a total update time by multiplying the average update time by the number of endpoints (e.g., the number of endpoints in the tenant's job list) and dividing by the number of concurrent connections file server 110 supports. In this example, it is assumed that each tenant's job list includes 1000 endpoints and that file server 110 supports 20 concurrent connections. For example, the total update time for tenant 120 can be calculated as (20 s*1000)/20=1000 s=16.66 minutes.

In step 5, management server 100 can calculate the number of file servers that would be needed for the endpoints of all tenants to complete (or download) their updates within the update window. As shown, management server 100 may calculate the number of file servers as the sum of the total update times divided by the update window. In this example, the sum of the total update times is 158 minutes and the update window is 120 minutes yielding 1.32 (or 2) file servers. In other words, if only file server 110 is used, not all endpoints will be able to download their respective updates between 2:00 and 4:00.

Figure 2E:
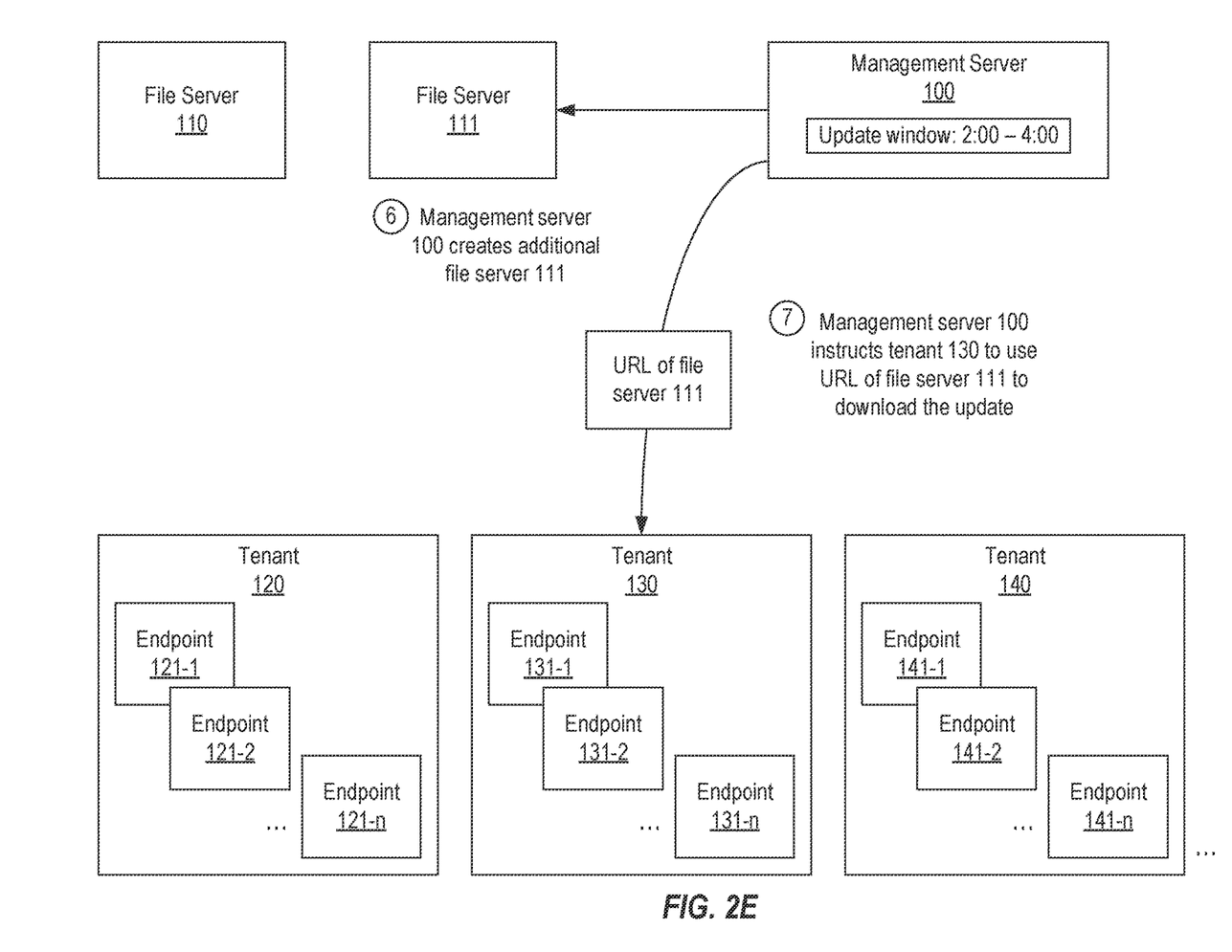

Turning to FIG. 2E, in step 6, management server 100 can create one or more additional file servers in accordance with the calculation in step 5. In this example, management server 100 can create file server 111. This creation of a file server can entail provisioning a repository that stores the update(s) for the endpoints of a tenant that will be instructed to obtain the update(s) from the newly created file server as opposed to an existing file server. In this example, because file server 110 is sufficient to enable the endpoints of tenant 120 and tenant 140 to obtain their updates but not sufficient for the endpoints of tenant 130 to obtain their updates during the update window, management server 100 can create file server 111 and provision it with the update(s) for the endpoints of tenant 130.

In step 7, management server 100 can notify endpoints 131-1-131-$n$ of tenant 130 that they should use the URL of file server 111 to obtain their updates as opposed to using the URL of file server 110. Although not shown, management server 100 could also update database 101 to reflect the addition of file server 111 and the assignment of tenant 130's endpoints to file server 111 for this particular update window.

Figure 2F:
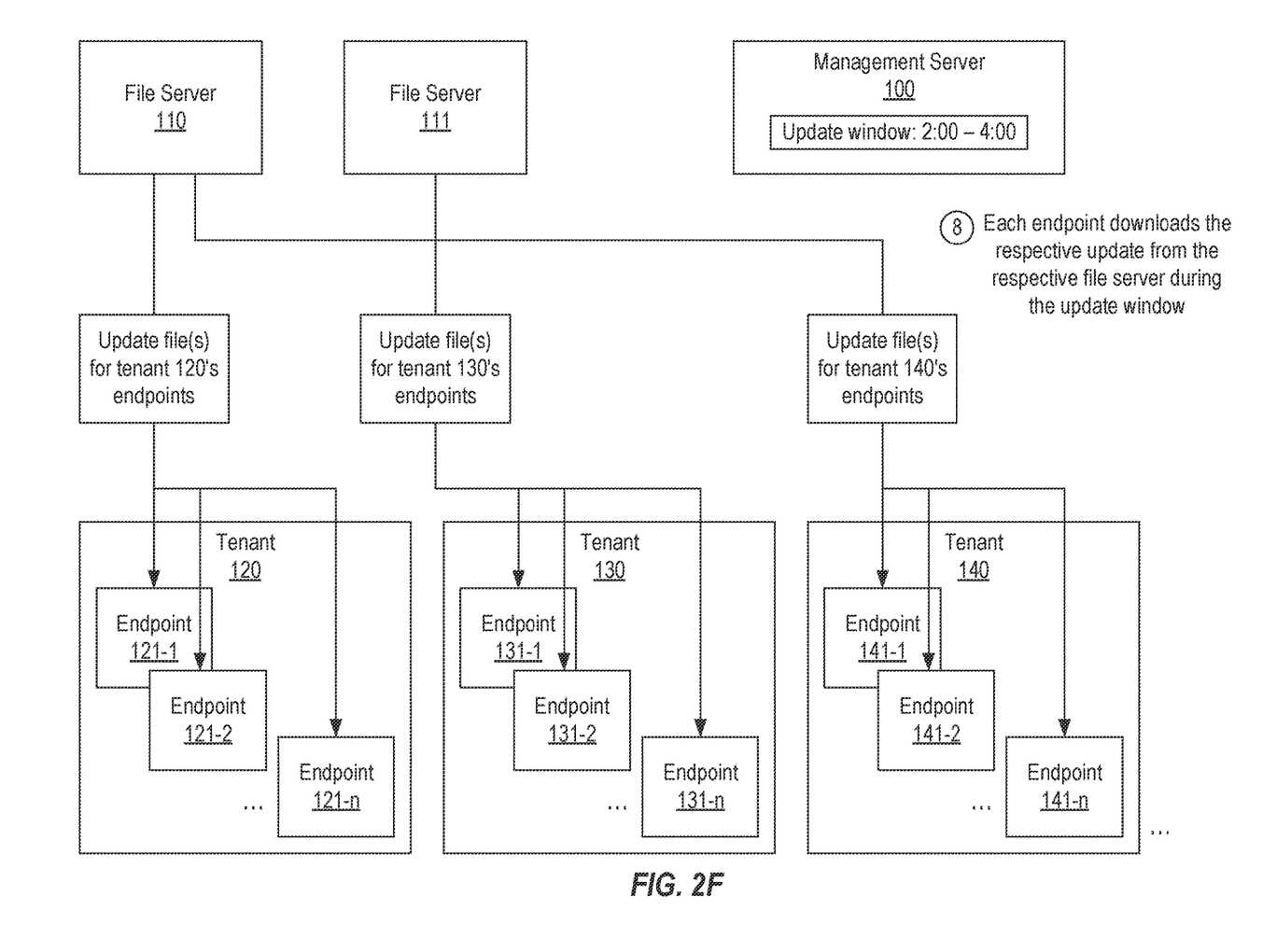

Turning to FIG. 2F, it is now assumed that the update window has been reached (if it had not already been reached in previous steps) and therefore the endpoints have begun the update process. For example, an agent on each endpoint of tenants 120, 130 and 140 can attempt to download each file of the respective update. In this example, the endpoints of tenants 120 and 140 will use the URL of file server 110 to download their respective updates while the endpoints of tenant 130 will use the URL of file server 111. Because management server 100 proactively auto scaled the multi-tenant environment, all endpoints of tenants 120, 130, and 140 will be able to establish a connection with the respective file server and download the respective update before the update window lapses.

Figure 2G:
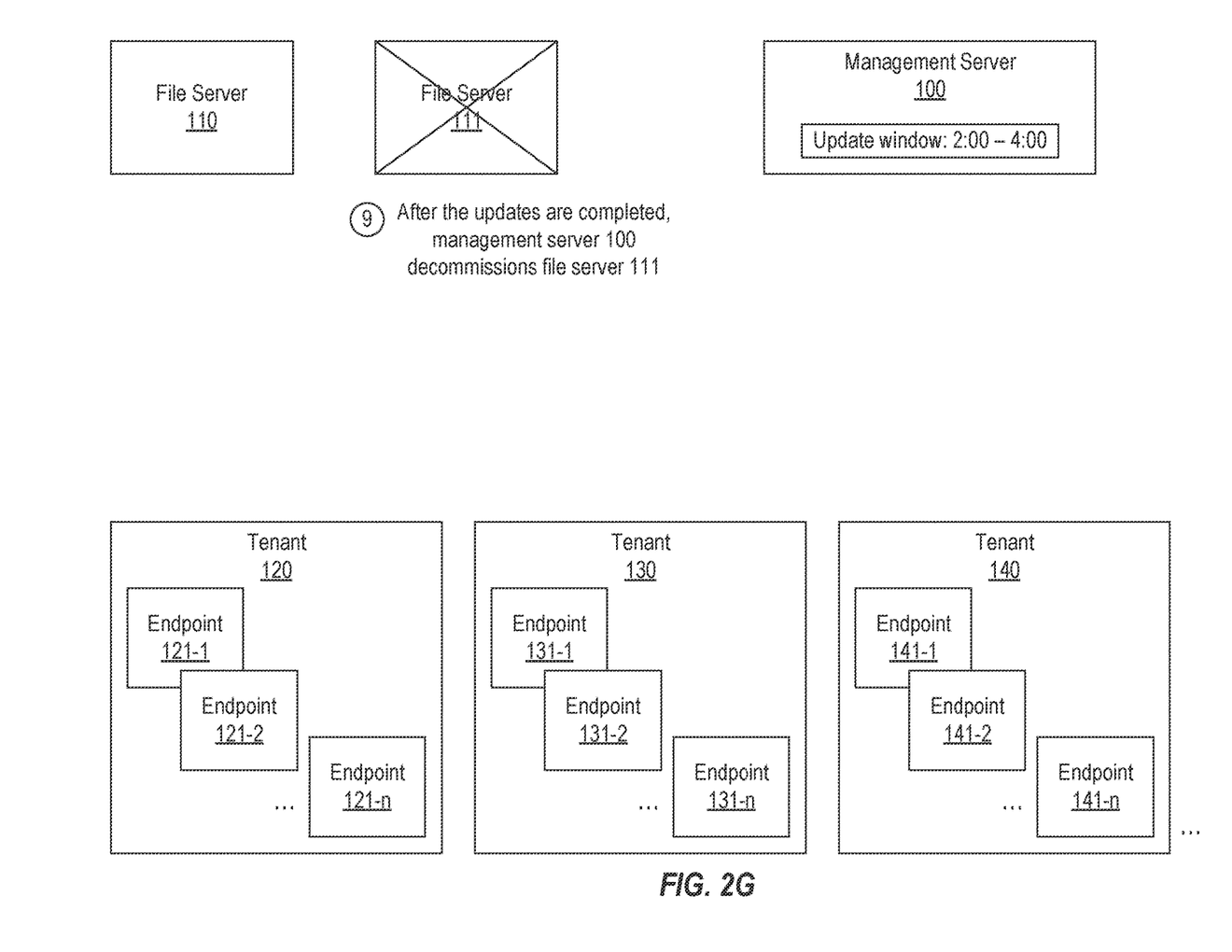

Turning to FIG. 2G, it is now assumed that all endpoints of tenant 130 have obtained their updates from file server 111 (or that the update window has elapsed), and therefore in step 9, management server 100 can decommission file server 111. This step may be performed to avoid the unnecessary consumption of resources whether on premises or in the cloud. Notably, at the next update window, management server 100 could repeat the above-described process to ensure that one or more additional file servers are proactively provisioned if necessary to ensure that all endpoints of any tenants that are scheduled for update during the next update window can obtain their respective updates during the next update window.

In some embodiments, management server 100 may also configure each file server based on the above-described calculations and/or tenant details. For example, management server 100 could configure a file server as a dedicated file server when it will provide updates to high priority endpoints (e.g., business critical endpoints), when it will distribute very large updates, when the update window is short, etc. As another example, management server 100 could configure a file server as a queued file server when it will provide updates to low priority endpoints or endpoints with low network speeds, when it will distribute relatively small updates, when the update window is long, etc. As a further example, management server 100 could configure a file server as a priority queue when it will distribute updates to medium priority endpoints, when the update window is short, etc.

In summary, embodiments of the present invention enable proactive auto scaling to be performed once an update window and job schedules are known as opposed to waiting until the endpoints start requesting updates during the update window. Embodiments of the present invention can implement this proactive auto scaling by prioritizing endpoints based on their network speeds and by prioritizing tenants based on the total amount of time it will take their endpoints to download an update. The proactive auto scaling also ensures that additional file servers are created on-the-fly and only as needed.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed is:

1. A method, implemented by a management server, for proactive auto scaling in a scaled multi-tenant environment, the method comprising:
    identifying an update window;
    determining that each of a plurality of tenants are scheduled to obtain a respective update from a file server during the update window;
    determining a total update time for each of the plurality of tenants to obtain the respective update from the file server;
    comparing the total update time for each of the plurality of tenants to the update window;
    determining, based on the comparison of the total update time for each of the plurality of tenants to the update window, that some but not all the endpoints of the plurality of tenants will be able to obtain the respective update from the file server during the update window;
    in response to the determination, creating one or more additional file servers; and
    in response to creating the one or more additional file servers, instructing a subset of the endpoints of the plurality of tenants to obtain the respective update from the one or more additional file servers during the update window.

2. The method of claim 1, wherein determining the total update time for each of the plurality of tenants to obtain the respective update from the file server comprises calculating an average update time for each of the plurality of tenants.

3. The method of claim 2, wherein calculating the average update time for each of the plurality of tenants comprises calculating a download time for each of the endpoints.

4. The method of claim 3, wherein calculating the download time for each of the endpoints comprises determining a network speed for each of the endpoints.

5. The method of claim 3, wherein the download time for each of the endpoints is calculating by dividing a size of the respective update by a network speed of the endpoint.

6. The method of claim 1, wherein the subset of the endpoints comprises endpoints of one or more tenants having a longer total update time.

7. The method of claim 1, further comprising:
    determining that the subset of the endpoints have obtained the respective update from the one or more additional file servers; and
    decommissioning the one or more additional file servers.

8. One or more computer storage media storing computer executable instructions which when executed implement a management server that is configured to implement a method for proactive auto scaling in a scaled multi-tenant environment, the method comprising:
    identifying an update window;
    obtaining tenant details from a plurality of tenants that have scheduled an update during the update window;
    calculating, for endpoints of the plurality of tenants, a download time for each of the endpoints based on a network speed of the respective endpoint;
    calculating, for each of the plurality of tenants, a total update time based on the download time for each of the endpoints of the respective tenant;
    comparing the total update time calculated for each of the plurality of tenants to the update window;
    determining, based on the comparison of the total update time calculated for each of the plurality of tenants to the update window, that some but not all the endpoints of the plurality of tenants will be able to obtain the respective update from a file server during the update window; and
    in response to the determination, creating one or more additional file servers from which a subset of the endpoints of the plurality of tenants will obtain the respective update.

9. The computer storage media of claim 8, wherein obtaining the tenant details comprises obtaining the network speed of each of the endpoints.

10. The computer storage media of claim 8, wherein calculating the download time for each of the endpoints based on the network speed of the respective endpoint comprises dividing a size of the respective update by the network speed of the respective endpoint.

11. The computer storage media of claim 8, wherein the method further comprises:
    calculating an average update time for each of the plurality of tenants.

12. The computer storage media of claim 8, wherein the subset of the endpoints pertain to one or more endpoints having a longer total update time.

13. The computer storage media of claim 8, further comprising:
    causing endpoints with a lower download time to be prioritized when obtaining the respective update.

14. The computer storage media of claim 8, further comprising:
    determining that the subset of endpoints have obtained the respective update from the one or more additional file servers; and
    decommissioning the one or more file servers.

15. The computer storage media of claim 8, wherein the method further comprises:
    excluding endpoints for which no network speed is determined from the calculation of the download time.

16. A system comprising:
    a management server;
    a plurality of tenants that each have a plurality of endpoints; and
    one or more file servers;
    wherein the management server is configured to implement a method for proactive auto scaling when the plurality of endpoints of the plurality of tenants are scheduled to be updated during an update window, the method comprising:
        identifying a network speed for each of the plurality of endpoints of each of the plurality of tenants;

calculating a download time for each of the plurality of endpoints of each of the plurality of tenants, the download time being calculated from the network speed of the respective endpoint and a size of an update that the respective endpoint is scheduled to obtain during the update window;

calculating an average update time for each of the plurality of tenants, the average update time being calculated based on the download times of the endpoints of the respective tenant;

calculating a total update time for each of the plurality of tenants, the total update time being calculated based on the average update times of the endpoints of the respective tenant; and creating one or more additional file servers based on the total update time for each of the plurality of tenants.

17. The system of claim 16, wherein creating the one or more additional file servers based on the total update time for each of the plurality of tenants comprises determining, from the total update time for each of the plurality of tenants, that the one or more file servers will be insufficient to enable all endpoints of the plurality of tenants to obtain the respective update from the one or more file servers during the update window.

18. The system of claim 16, wherein the method performed by the management server further comprises:
instructing the endpoints of a subset of the plurality of tenants to obtain the respective update from the one or more additional file servers.

19. The system of claim 18, wherein the subset of the plurality of tenants includes one or more tenants having the total update time that is longer than the total update time of one or more other tenants.

20. The system of claim 16, wherein the method performed by the management server further comprises:
causing the one or more file servers or the one or more additional file servers to prioritize at least some of the plurality of endpoints based on the network speed of the respective endpoints.

* * * * *